Feb. 23, 1960 C. E. SUTTON 2,926,224
AUTOMATIC ACCELERATOR STOP LIGHT SWITCH ASSEMBLY
Filed June 2, 1958
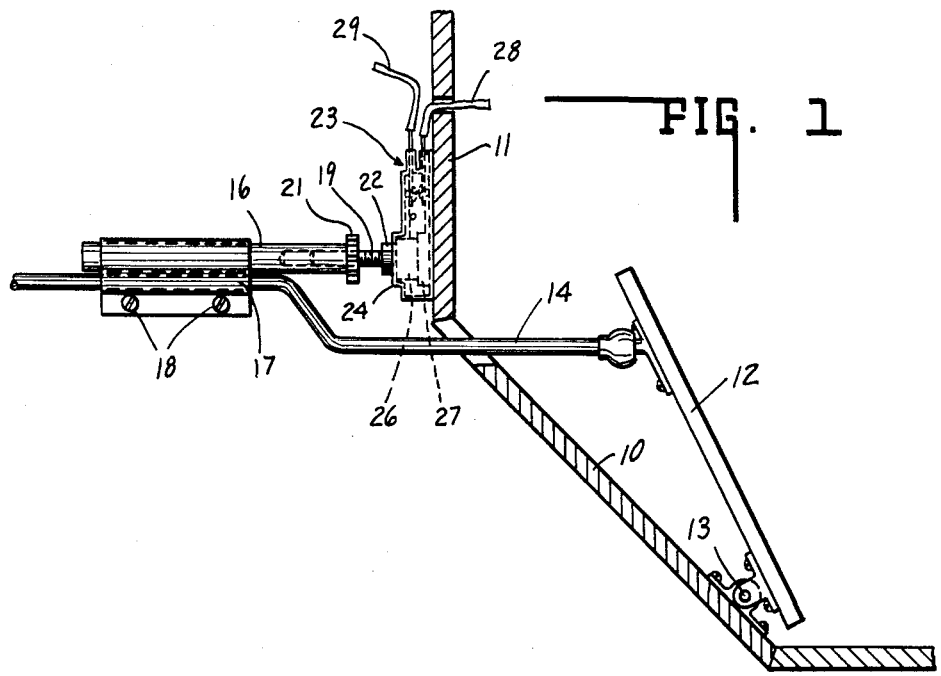
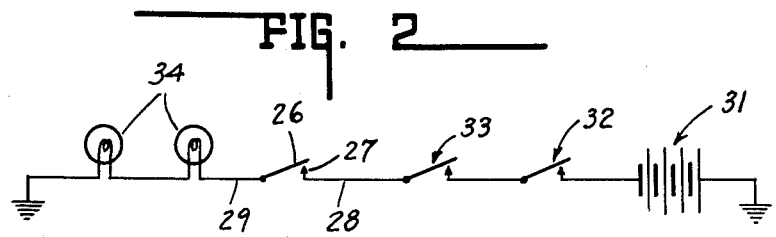
INVENTOR.
CHARLES E. SUTTON.
BY
Lockwood, Galt, Woodard + Smith
ATTORNEYS.

2,926,224

AUTOMATIC ACCELERATOR STOP LIGHT SWITCH ASSEMBLY

Charles E. Sutton, Marion, Ind.

Application June 2, 1958, Serial No. 739,415

2 Claims. (Cl. 200—61.89)

This invention relates generally to a switch assembly and in particular to a stop light switch assembly actuated by release of the accelerator pedal of an auto, truck or the like.

Conventionally, auto and truck stop lights operate in response to actuation of the brake pedal to provide a signal indicating that the vehicle is slowing down. When brakes are applied suddenly in rapidly moving, closely spaced traffic, the conventional auto stop light arrangement provides only a dangerously abbreviated warning to vehicles approaching from the rear. Evaluation of safety statistics and actual experience in the field of traffic control have indicated that even a brief extension of the duration of the stop light warning signal is important in minimizing or preventing rear end collisions.

The present invention provides a switch assembly which is actuated upon release of an auto accelerator pedal. The electrical contacts of the switch may be connected in parallel with the conventional stop light system of an auto or truck and in no way interferes with conventional stop light operation. On new vehicles, where the assembly of the present invention is installed as original equipment, the conventional brake-operated stop light switch may be omitted. Because of its mode of operation, the assembly of the present invention extends the stop light warning signal time by the time interval required for the auto driver to transfer his foot from the accelerator pedal to the brake pedal and thereafter actuate the brake.

It is a primary object of the present invention therefore to provide an auto or truck stop light assembly which provides an added safety factor in the operation of a vehicle equipped therewith.

It is a further object of the present invention to provide an independently operating stop light switch assembly that is adaptable for installation during assembly of new vehicles thus eliminating the need for the slower-reacting stop light switch or similar device.

A further object of the present invention is to provide a stop light switch assembly which is adapted to be actuated upon release of an auto or truck accelerator pedal.

A further object of the present invention is to provide a stop light switch assembly which is characterized by simplified installation and trouble-free operation.

A further object of the present invention is to provide a stop light switch assembly which is adjustable to obtain proper co-ordination of the accelerator pedal and the switch contacts in various installations.

The full nature of the invention will be understood from the accompanying drawings and the following description and claims:

Fig. 1 is a side view of an assembly embodying the present invention installed in an auto.

Fig. 2 is a schematic wiring diagram of the assembly shown in Fig. 1.

Referring initially to Fig. 1, there is shown at 10 the floorboard of a conventional auto and at 11 the bulwark conventionally separating the motor housing and the passenger compartment of an auto. The accelerator pedal 12 is pivotally supported at 13 in conventional fashion, and is provided with a conventional ball and socket joint linking it to an accelerator carburetor connecting rod 14. While only a portion of the connecting rod is shown, it will be understood, however, that the rod conventionally links the accelerator pedal with the butterfly valve on the engine carburetor.

An activating rod 16 is rigidly mounted upon the connecting rod 14 by means of a bracket 17 which is tightened into clamping relation with these two elements by means of bolts 18. In the case where the assembly of the present invention is incorporated as original equipment on a new vehicle, it will be understood that the activating rod 16 may be manufactured as part of connecting rod 14, or may be welded or otherwise attached thereto. The activating rod has an internally threaded aperture which receives an adjusting bolt 19. The bolt may be adjustably positioned within the activating rod and locked in the desired position by means of a lock nut 21, the head 22 of the adjusting bolt being thereby adjustably positionable with relation to the activating rod.

The head of the adjusting bolt cooperates with an enclosed, waterproof switch indicated generally at 23. The switch is of a conventional type which may have a somewhat resilient portion 24 adjacent the adjusting bolt head, and is provided with a movable contact 26 and a fixed contact 27. The contacts are electrically connected to lead wires 28 and 29, and the switch is mounted upon the bulwark 11. It will be understood that the drawing illustrates one possible mounting location for the switch. Depending upon the configuration of the particular accelerator carburetor connecting rod and the available mounting space in a particular installation, other mounting locations for the switch might be utilized.

Referring now to Fig. 2, the schematic wiring diagram includes a source of power, such as the auto battery 31 and the conventional auto ignition switch 32. The ignition switch may be serially connected to a manual switch 33 mounted on the auto dash-board and utilized to energize the stop light signal system of the present invention. The manual switch is connected by means of the lead 28 to the switch contact 27, the movable contact 26 of the switch being further connected by means of the lead 29 to the conventional auto stop lights 34. As previously mentioned, this serially connected circuit is installed in parallel to the conventional brake-operated energizing circuit for the stop lights 34 and may be connected to provide an electrical path around the conventional brake-operated switch to the vehicle stop lights.

After installation, the adjusting bolt is positioned so that when the accelerator pedal is in released position, the switch contacts are closed. Movement of the accelerator pedal so as to increase the engine speed will, therefore, cause the contacts to open. With the switches 32 and 33 closed and with the accelerator pedal in cruising position, it will be evident that switch contacts 26 and 27 will be separated and the auto stop lights de-energized. Upon release of the accelerator the adjusting bolt will close switch contacts 26 and 27, energizing the stop lights.

The assembly of the present invention thus energizes the auto stop lights immediately upon release of the accelerator and is independent of subsequent application of the auto brakes. When driving conditions call for retarded speed by means of motor drag, rather than by heavy braking, the assembly of the present invention gives adequate warning to vehicles approaching from the rear. The manually operated switch 33 may or may not be installed with the assembly of the present invention. In city traffic, in the case of a vehicle having a conventional gear shift, release of the accelerator to perform the gear shifting operation might undesirably energize the stop light signal with each gear shifting operation. With autos having conventional shift transmissions the manual switch thus may be used to remove the assembly of the present invention from operation when its use would be inoportune.

The assembly of the present invention affords a further advantage in that an inattentive driver following too closely in the rear of an auto equipped with the present invention may be made aware of this fact and properly warned by momentarily releasing the accelerator, bringing on the vehicle stop lights. This warning may be given without appreciably slowing the lead vehicle and without, therefore, jeopardizing the safety of either the leading or trailing vehicle. Since the first movement a driver makes in the event of an unexpected emergency ahead is to remove his foot from the accelerator, it will be evident that the assembly of the present invention lengthens the duration of the warning signal provided by the stop lights in comparison to the warning signal interval provided by the conventional brake operated stop light system.

As described herein the signal given by the vehicle stop lights does not distinguish between that initiated by the assembly of the present invention and the conventional brake-operated system. In the case of vehicles equipped with stop lights which are independent of the directional turn signals, the switch incorporated in the assembly of the present invention might be utilized to energize a flasher device for intermittently energizing the vehicle stop lights. With this arrangement, the conventional brake operated stop light system thus would give an uninterrupted warning signal and the assembly of the present invention would give a flashing or intermittent signal.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A stop light switch assembly adapted for use with a motor vehicle having stop lights, an accelerator pedal and a motion transmission linkage between its accelerator pedal and carburetor, said assembly comprising a bracket adapted to be mounted on and movable with the motion transmission linkage, an internally threaded member carried by said bracket, an adjusting bolt threaded into said member and extending therefrom, means for locking said bolt in adjusted position, a normally open switch stationarily mounted adjacent the extending end of said adjusting bolt and adapted to be actuated thereby, and circuit means interconnecting said switch with the vehicle stop lights, whereby said adjusting bolt may be positioned relative to said member to actuate said switch to closed position when the accelerator pedal is released and to de-actuate said switch to open position when the accelerator pedal is in other than released position.

2. A stop light switch assembly adapted for use with a motor vehicle having stop lights, an accelerator pedal and a motion transmission linkage between its accelerator pedal and carburetor, said assembly comprising a support adapted to be mounted on and movable with the motion transmission linkage, an internally threaded member carried by said support, an adjusting bolt threaded into said member and extending therefrom, a normally open switch stationarily mounted adjacent the extending end of said adjusting bolt and adapted to be actuated thereby, and circuit means including a normally open manually operated switch connected in series with said first-mentioned switch to provide an energizing circuit for the vehicle stop lights, whereby said adjusting bolt may be positioned relative to said member to actuate said first-mentioned switch to closed position when the accelerator pedal is released and to de-actuate said switch to open position when the accelerator pedal is in other than released position.

References Cited in the file of this patent

UNITED STATES PATENTS

| | | |
|---|---|---|
| 1,893,369 | Jaros et al. | Jan. 3, 1933 |
| 2,643,309 | Pellegrino | June 23, 1953 |
| 2,650,963 | Graveno | Sept. 1, 1953 |
| 2,734,105 | Perry | Feb. 7, 1956 |